United States Patent
Ohashi

(12) 
(10) Patent No.: US 8,844,594 B2
(45) Date of Patent: Sep. 30, 2014

(54) PNEUMATIC TIRE WITH TREAD HAVING BLOCKS AND TRANSVERSE GROOVES

(75) Inventor: Toshiyuki Ohashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1506 days.

(21) Appl. No.: 11/557,436

(22) Filed: Nov. 7, 2006

(65) Prior Publication Data

US 2007/0102085 A1    May 10, 2007

(30) Foreign Application Priority Data

Nov. 9, 2005    (JP) .................................. 2005-324594

(51) Int. Cl.
*B60C 11/11*    (2006.01)
*B60C 11/13*    (2006.01)
*B60C 11/03*    (2006.01)

(52) U.S. Cl.
CPC ............. *B60C 11/13* (2013.01); *B60C 11/0309* (2013.01); *B60C 11/0316* (2013.01); *Y10S 152/902* (2013.01)
USPC ...................... 152/209.21; 152/902

(58) Field of Classification Search
USPC .................... 152/209.15, 209.18, 209.21, 902
See application file for complete search history.

(56) References Cited

U.S. PATENT DOCUMENTS

| | | | |
|---|---|---|---|
| 4,057,089 A * | 11/1977 | Johannsen | 152/209.18 |
| 4,630,661 A | 12/1986 | Stelzer | |
| 5,690,761 A | 11/1997 | Masaoka | |
| 6,079,464 A | 6/2000 | Hatakenaka et al. | |
| 6,102,093 A * | 8/2000 | Nakagawa | 152/902 |
| 2002/0007889 A1 * | 1/2002 | Eromaki | 152/209.17 |
| 2003/0102064 A1 | 6/2003 | Below | |
| 2004/0069389 A1 * | 4/2004 | Ratliff, Jr. | 152/209.15 |
| 2004/0238092 A1 * | 12/2004 | Colombo et al. | 152/209.15 |

FOREIGN PATENT DOCUMENTS

| | | | |
|---|---|---|---|
| CA | 2083627 | * | 9/1999 |
| DE | 36 03 034 A1 | | 8/1986 |
| EP | 0 148 151 A2 | | 11/1984 |
| EP | 0 296 605 A2 | | 6/1988 |
| FR | 2 534 858 A1 | | 10/1983 |
| GB | 460338 | * | 1/1937 |
| JP | 62-151101 U | * | 9/1987 |
| JP | 01-223006 | * | 9/1989 |
| JP | 5-229312 | | 9/1993 |
| JP | 7-81318 | | 3/1995 |

(Continued)

OTHER PUBLICATIONS

Abstract for JP 2002-301908 dated Jan. 20, 2010.*
Machine translation for JP 2002-301908 dated Nov. 6, 2009.*

(Continued)

*Primary Examiner* — Steven D Maki
(74) *Attorney, Agent, or Firm* — Knobbe Martens Olson & Bear LLP

(57) ABSTRACT

The invention provides a pneumatic tire which can increase a driving performance on a road surface of a so-called sherbet snow, and in which a biased wear such as a toe-and-heel wear or the like is hard to be generated. In a pneumatic tire provided with a tread pattern having a transverse groove 2b formed between a plurality of blocks 1b, the transverse groove 2b is provided with a top side groove portion 11 extending while a groove width GW expands to a tread end side, and a bottom side groove portion 12 extending with a roughly fixed groove width GW.

11 Claims, 4 Drawing Sheets

(56) References Cited

FOREIGN PATENT DOCUMENTS

| | | | |
|---|---|---|---|
| JP | 7-304309 | | 11/1995 |
| JP | 2001-180227 | * | 7/2001 |
| JP | 2002-301908 | * | 10/2002 |
| JP | 2002-321509 A | | 11/2002 |

OTHER PUBLICATIONS translation for Japan 62-151101 U (no date).*
Office Action issued on Sep. 23, 2009 for Chinese Counterpart Patent Application No. 200610143957.7.
Office Action issued by the Chinese Patent Office on Sep. 15, 2010 for the counterpart Chinese Patent Application No. 200610143957.7.

* cited by examiner (a)

(b)

(a)

(b)

PNEUMATIC TIRE WITH TREAD HAVING BLOCKS AND TRANSVERSE GROOVES

BACKGROUND OF THE INVENTION

1. Field of the Invention

The present invention relates to a pneumatic tire provided with a tread pattern having a transverse groove formed between a plurality of blocks, and is particularly useful for a studless tire.

2. Description of the Related Art

In general, various types of tread patterns are formed in the pneumatic tire for preventing a slip with respect to a road surface during the driving, however, since a performance of the tire having the normal tread pattern is inferior on an iced or snowed road, a special tire is used for driving on the frozen road.

As the tire mentioned above, a studless tire using no metal stud becomes popular at present. The studless tire has a comparatively soft rubber tread, is provided with a lot of blocks on a surface thereof in a projecting manner, and is generally structured such that a plurality of sipes (narrow grooves) is formed in a tire width direction with respect to each of the blocks. In accordance with the studless tire, it is possible to improve a friction force applied to a road surface, by sucking up a water screen on the frozen road by the sipes.

On the other hand, with respect to the iced and snowed road, since the groove between the blocks of the studless tire is deep and wide, the hard packed snow is filled in the groove, and a certain degree of driving force and braking force can be generated via the snow. However, in the case that an air temperature rises and the iced and snowed road is in a so-called sherbet state, there is a lot of cases that the normal studless tire can not generate the sufficient driving force and braking force.

For the purpose of solving the problem mentioned above, the Japanese Unexamined Patent Publication No. 7-81318 discloses a studless tire provided with a lot of long anti-slip holes corresponding to a long quadrangular recess in which both side surfaces are formed as a slope surface and provided with a hill in a bottom thereof, a lot of circular anti-slip holes corresponding to a bowl-shaped recess, provided with a water reservoir in a center and forming an annular step portion in the middle thereof, a lot of rectangular anti-slip holes corresponding to a quadrangular recess in which both side surfaces are formed as a slope surface, provided with a water reservoir in a center portion and forming a step portion in the middle of the slope surface, a lot of diagonal anti-slip holes corresponding to a quadrangular recess in which both side surfaces are formed as a slope surface, provided with a water reservoir in a center portion and formed so as to be sloped with respect to a width direction of the tire, a lot of anti-slip chips in which a fibrous chip made of a good water absorbing material is buried within a depressed portion having an appropriate depth and an appropriate shape, and a lot of drain grooves coupling the portions mentioned above.

However, in the studless tire, since groove widths of the drain groove coupling the respective portions and the drain grooves connected to the tread end are narrow, it can not be said that a draining effect is sufficient with respect to the road surface on the snow in the sherbet state, a state close to a hydroplaning tends to be generated, and a sufficient driving performance is hard to be obtained.

Further, for the purpose of increasing the driving performance on the road surface of the snow in the sherbet state, there can be considered a method of increasing the drawing performance by enlarging the width of the transverse grooves existing between the blocks in such a manner as to be wider in the tread end side. However, in this case, since the rigidity of the block is partly lowered in the portion having the wide groove width due to the different width of the transverse groove, a biased wear such as a toe-and-heel wear or the like tends to be generated.

SUMMARY OF THE INVENTION

Accordingly, an object of the present invention is to provide a pneumatic tire which can increase a driving performance on a road surface of a so-called sherbet snow, and in which a biased wear such as a toe-and-heel wear or the like is hard to be generated.

The object mentioned above can be achieved by the present invention as mentioned below.

In other words, in accordance with the present invention, there is provided a pneumatic tire provided with a tread pattern having a transverse groove formed between a plurality of blocks, wherein the transverse groove comprises:

a top side groove portion extending while a groove width expands to a tread end side; and a bottom side groove portion extending with a roughly fixed groove width. In this case, "groove width" is based on an interval between center surfaces of groove wall surfaces, as mentioned below.

In accordance with the pneumatic tire on the basis of the present invention, since the transverse groove has the top side groove portion extending while the groove width expands to the tread end side, it is possible to effectively discharge the snow in the sherbet state to the tread end side, so that it is possible to increase the driving performance on the road surface of the sherbet snow. At this time, since the transverse groove has the bottom side groove portion extending with a roughly fixed groove width, a rigidity in a lower side of the block can be maintained, so that a biased wear such as a toe-and-heel wear or the like is hard to be generated.

In the structure mentioned above, it is preferable that at least the top side groove portion has a zigzag wall surface. Since at least the top side groove portion has the zigzag wall surface, whereby an edge length and an edge direction of the block are increased, it is possible to further improve an edge effect of the block.

Further, it is preferable that the bottom side groove portion of the transverse groove is provided from the bottom surface to a height of 15 to 50% of the block height, and the remaining portions are formed as the top side groove portion. The rigidity in the lower side of the block can be sufficiently maintained by forming the bottom side groove portion of the transverse groove in the region mentioned above, and it is possible to more effectively discharge the snow in the sherbet state by the tread end side on the basis of the remaining top side groove portion.

Further, it is preferable that the transverse groove is provided within a region of 0 to 50% of the tread width from the tread ends in both sides. This region corresponds to a region in which the biased wear such as the toe-and-heel wear or the like tends to be generated, particularly by the driving on a dry and wet road surface, and it is possible to effectively increase a driving performance on the snowed road surface, by discharging the snow in the sherbet state to the tread end side in this region.

BRIEF DESCRIPTION OF THE DRAWINGS

FIGS. 2A and 2B are enlarged views of a main portion showing an example of a transverse groove in the pneumatic tire in accordance with the present invention, in which FIG. 2A is a perspective view of the transverse groove as seen from a tread end side, and FIG. 2B is a plan view of FIG. 2A;

DETAILED DESCRIPTION OF THE PREFERRED EMBODIMENTS

A description will be given below of an embodiment in accordance with the present invention with reference to the accompanying drawings.

Figure 1:
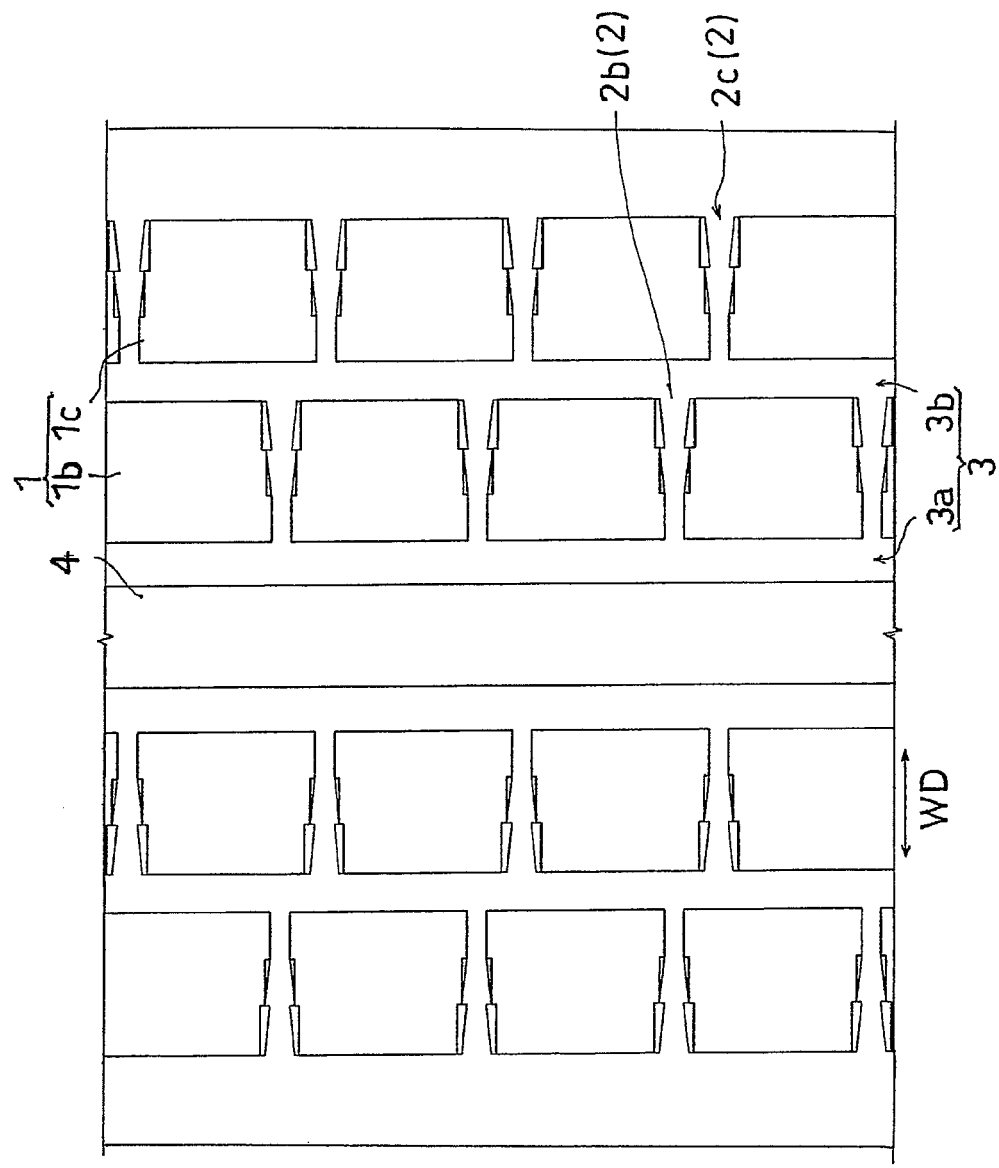
FIG. 1 is an expansion plan showing an example of a tread pattern in a pneumatic tire in accordance with the present invention.

The pneumatic tire in accordance with the present invention is provided with a tread pattern having a transverse groove 2 formed between a plurality of blocks 1, as shown in FIG. 1. In the present embodiment, there is shown an example in which one line of rib 4 and four lines of blocks 1b to 1c sectioned by four peripheral grooves 3a to 3b are formed approximately in symmetrical.

Each of the peripheral grooves 3a to 3b is formed approximately in a linear shape, and has a zigzag wall surface in both sides. Further, each of the transverse grooves 2b to 2c is formed at an angle which is slightly inclined from a tier width direction WD.

It is preferable that a lot of sipes having a wavy shape or the like are formed approximately in a tire width direction WD in each of the blocks 1b to 1c. In this case, a shape, a formed position and the like of the sipe can be variously selected. In this case, it is preferable that a sipe density of the sipe is between 0.05 and 0.20 mm/mm$^2$, and it is more preferable that it is between 0.1 and 0.18 mm/mm$^2$.

The pneumatic tire in accordance with the present invention is characterized in that the transverse groove 2b is provided with a top side groove portion 11 extending while a groove width is expanded to a tread end side, and a bottom side groove portion 12 extending with a roughly fixed groove width, as shown in FIGS. 2A to 2B. In the present embodiment, there is shown an example in which in the transverse grooves 2b to 2c, only the transverse groove 2b is provided with the top side groove portion 11 and the bottom side groove portion 12, and the top side groove portion 11 and the bottom side groove portion 12 have zigzag wall surfaces 11a and 12a.

In other words, in the present invention, a groove width GW based on an interval between center surfaces 11b of the wall surfaces 11a of the top side groove portions 11 is expanded to the tread end side, and a groove width GW based on an interval between center surfaces 12b of the wall surfaces 12a of the bottom side groove portions 12 is approximately constant. In this case of the drawing, the wall surface 11a and the wall surface 12a are drawn perpendicular to the bottom surface 13, however, are slightly inclined actually in such a manner that the groove bottom side is narrowed, and a boundary portion between the bottom surface 13 and the wall surface 12a is formed in a rounded shape.

In the present invention, in view of increasing an effect of discharging the snow in the sherbet state to the tread end side, it is preferable to set a distance ratio (W2/W1) between a maximum portion (a width W2) and a minimum portion (a width W1) of the distance between the wall surfaces 11a of the top side groove portions 11 to 1.05 to 2, and it is more preferable to set it to 1.1 to 1.6.

In this case, it is preferable to set the width W1 of the minimum portion of the distance between the wall surfaces 11a to 3 to 7 mm, and it is preferable to set the groove width GW based on the interval between the center surfaces 12b of the bottom side groove portions 12 to 3 to 10 mm. At this time, the minimum portion of the distance between the wall surfaces 11a may be smaller than the interval between the center surfaces 12b of the bottom side groove portions 12.

In the present invention, it is preferable that the bottom side groove portion 12 of the transverse groove 2b is provided at a height which is 15 to 50% of a block height BH from the bottom surface 13, and it is more preferable that it is provided at a height which is 20 to 40% of the block height BH. If the height H1 of the bottom side groove portion 12 is less than 15% of the block height BH, there is a tendency that an effect of maintaining a rigidity of the block 1b becomes insufficient, and if the height H1 of the bottom side groove portion 12 is over 50% of the block height BH, there is a tendency that the effect of discharging the snow in the sherbet state to the tread end side becomes insufficient.

There is a case that a platform indicating an wear limit of a studless effect is formed at a height which is approximately 50% of the block height BH, in the studless tire, however, it is preferable that a height of the bottom side groove portion 12 is lower than a height of the platform.

In accordance with the present embodiment, there is shown an example in which the top side groove portion 11 and the bottom side groove portion 12 have the zigzag wall surfaces 11a and 12a. However, in the case that the bottom side groove portion 12 has the zigzag wall surface 12a, it is possible to maintain a block edge effect by the wall surface 12a of the bottom side groove portion 12, even in the case that the top side groove portion 11 wears out due to an wear over time. In this case, for maintaining the block edge effect, it is preferable that a cycle of the zigzag in the zigzag wall surface 12a of the bottom side groove portion 12 is smaller than that in the zigzag wall surface 11a of the top side groove portion 11.

In this case, in the present embodiment, the remaining portions of the bottom side groove portion 12 of the transverse groove 2b are formed as the top side groove portion 11. Further, it is preferable to set the block height BH of the block 1b adjacent to the transverse groove 2b to 7 to 11 mm.

In the present invention, it is preferable that the transverse groove 2b having the feature mentioned above is provided within a region which is 0 to 50% of the tread width from the tread ends in both sides, and it is more preferable that it is provided within a region which is 0 to 30% of the tread width.

The pneumatic tire in accordance with the present invention is identical to the normal pneumatic tire except for providing the tread pattern as mentioned above. Any of the conventionally known materials, shapes, structures, manufacturing methods and the like can be employed in the present invention.

Since the pneumatic tire in accordance with the present invention can improve a driving performance on the road surface of the so-called sherbet snow, and is provided with the tread pattern which is hard to generate the biased wear such as the toe-and-heel wear or the like, the pneumatic tire is useful particularly for the studless tire (winter tire).

[Other Embodiments]

A description will be given below of the other embodiments in accordance with the present invention.

(1) In the embodiment mentioned above, there is shown the example which is provided with the tread pattern in which the approximately square block is entirely formed, however, the block is not limited to this shape, but may employ a block formed in a rectangular shape, a parallelogram shape, a rhombic shape or the like. Further, a rib extending linearly in the tire peripheral direction, a rib extending zigzag in the tire peripheral direction or the like may be formed together with the block.

Figure 3:
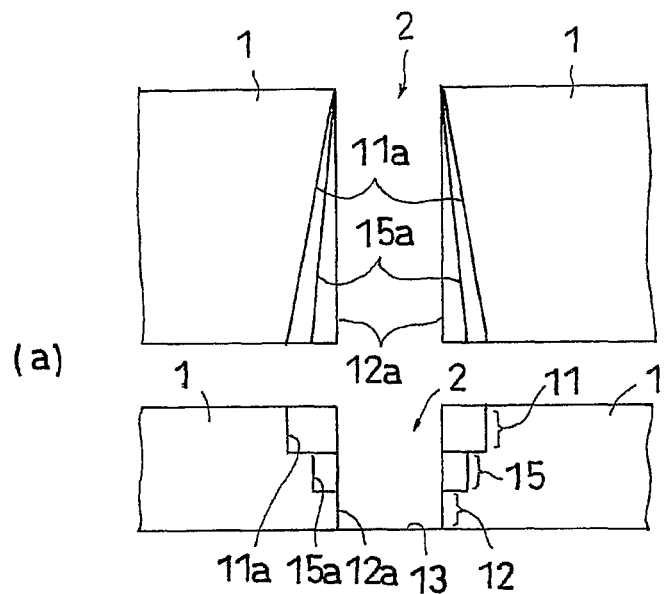
FIG. 3A is an enlarged view of a main portion showing another example of the transverse groove in the pneumatic tire in accordance with the present invention.
FIG. 3B is an enlarged view of a main portion showing another example of the transverse groove in the pneumatic tire in accordance with the present invention.
Figure 3:
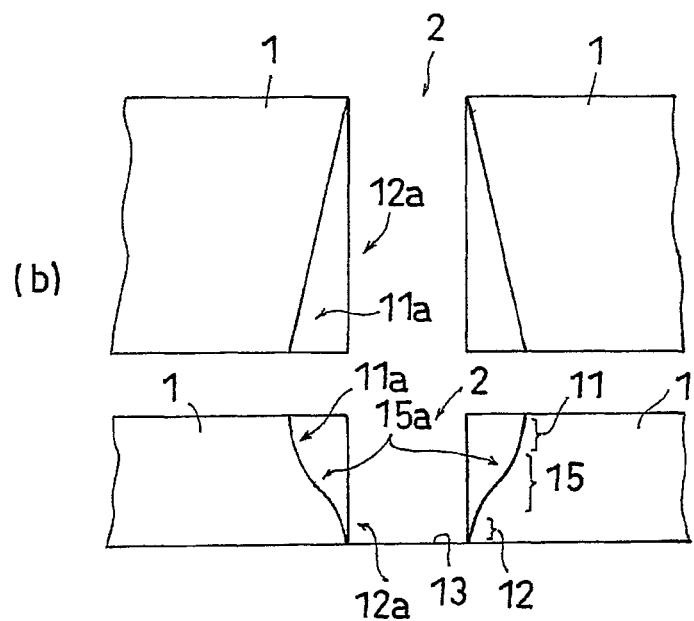

(2) In the embodiment mentioned above, there is shown the example in which the transverse groove is constituted only by the top side groove portion having the zigzag wall surface and the bottom side groove portion having the zigzag wall surface, however, the transverse groove in accordance with the present invention can employ various embodiment as shown in FIGS. 3A to 3B. In other words, a planer or wavy wall surface may be provided in place of the zigzag wall surface. In this case, a plan view and a front elevational view are illustrated up and down in the respective drawings.

In the example shown in FIG. 3A, the transverse groove 2 is constituted by the top side groove portion 11 having the planar wall surface 11a, the bottom side groove portion 12 having the planar wall surface 12a, and an intermediate groove portion 15 provided in the middle thereof and having a planar wall surface 15a. In the present invention, the transverse groove 2 may have the other portion than the top side groove portion 11 and the bottom side groove portion 12, as mentioned above.

In the illustrated example, the intermediate groove portion 15 extends while the groove width expands to the tread end side, in the same manner as the top side groove portion 11. In this case, all of the top side groove portion 11, the intermediate groove portion 15 and the bottom side groove portion 12 may have the zigzag wall surface.

In the example, shown in FIG. 3B, the wall surface 11a of the top side groove portion 11 and the wall surface 12a of the bottom side groove portion 12 are inclined with respect to the groove bottom 13, and both of them are smoothly connected via the wall surface 15a of the intermediate groove portion 15. In the present invention, the wall surface 11a of the top side groove portion 11 and the wall surface 12a of the bottom side groove portion 12 may be formed in a curved surface as mentioned above.

Further, in the example shown in FIG. 3B, the wall surface 11a of the top side groove portion 11 and the wall surface 12a of the bottom side groove portion 12 may be structured by an approximately flat slope surface.

(3) In the embodiment mentioned above, there is shown the example in which in the transverse grooves 2b to 2c in FIG. 1, only the transverse groove 2b is provided with the top side groove portion 11 and the bottom side groove portion 12, however, the top side groove portion 11 and the bottom side groove portion 12 may also be provided in the transverse groove 2c formed between the blocks 1c.

(4) In the embodiment mentioned above, the zigzag wall surface of the top side groove portion and the zigzag wall surface of the bottom side groove portion are formed in a synchronous zigzag shape, however, the cycles of the zigzag shapes of the both may be different.

EXAMPLES

A description will be given below of Examples and the like specifically showing the structure and the effect of the present invention. In this case, each of performance evaluations of the tire is executed as follows.

(1) Driving Performance on Road Surface in Sherbet State

The tire is installed to a real car (a domestic FR sedan of 3000 cc class), is run on a road surface in a sherbet state (a depth of the sherbet is about 8 mm) under a load condition that one passenger rides, is subjected to a straight driving, a turning, a braking and the like, and is evaluated on the basis of a sensory test of a driver. In this case, the evaluation is indicated by an index number on the assumption that the conventional product (Comparative Example 1) is set to 100, and the larger the numerical value is, the better the result is.

(2) Wear Proof Performance

The tire is installed to a real car (a domestic FR sedan of 3000 cc class), is measured for a step wear amount (a maximum value of a vertical interval between front and rear sides of the block end line due to the wear) at a time of driving on a dry paved road at 8000 km under a load condition that one passenger rides, and is evaluated by an index number. In this case, the evaluation is indicated by an index number on the assumption that the conventional product (Comparative Example 1) is set to 100, and the larger the numerical value is, the better the result is.

Comparative Example 1

Conventional Product

Figure 4:
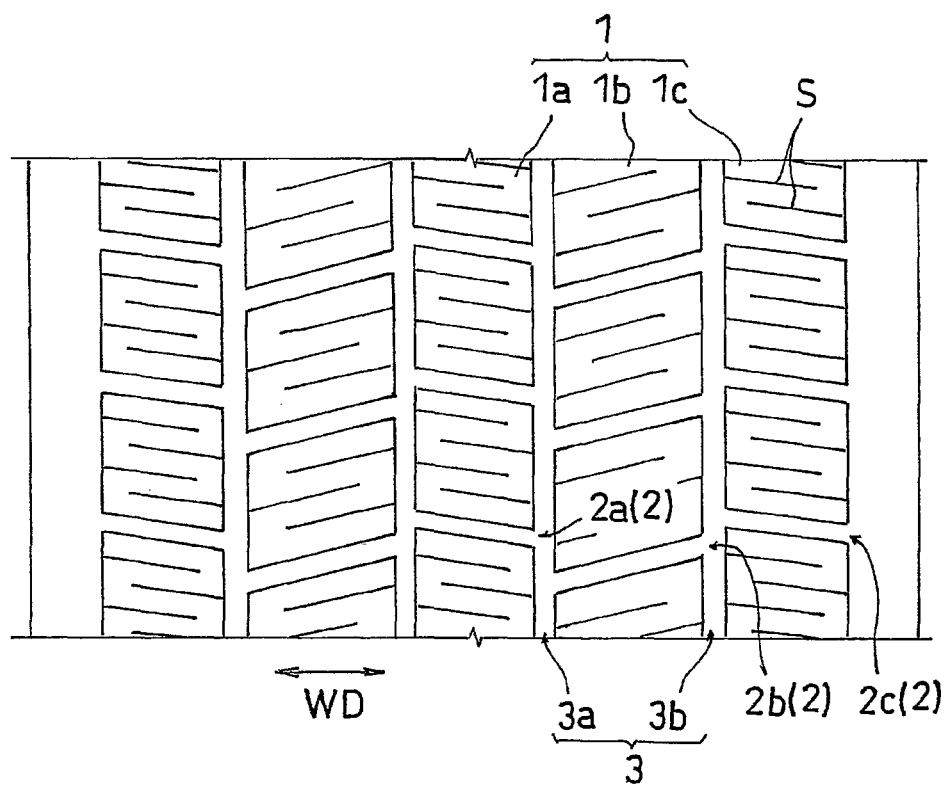
FIG. 4 is an expansion plan showing an example of a tread pattern of a conventional product (Comparative Example 1).

In the tread pattern shown in FIG. 4, the height of the block is fixed to 9 mm, the width of the wavy sipe is fixed to 0.3 mm, the widths of the transverse grooves 2a to 2c are fixed to 7 mm, the width of the peripheral groove 3a is set to 7 mm, and the width of the peripheral groove 3b is set to 7 mm, whereby a radial tire of size 205/65R15 is manufactured. Table 1 shows the result obtained by executing the respective performance evaluations mentioned above by using the tire.

Example 1

Figure 2:
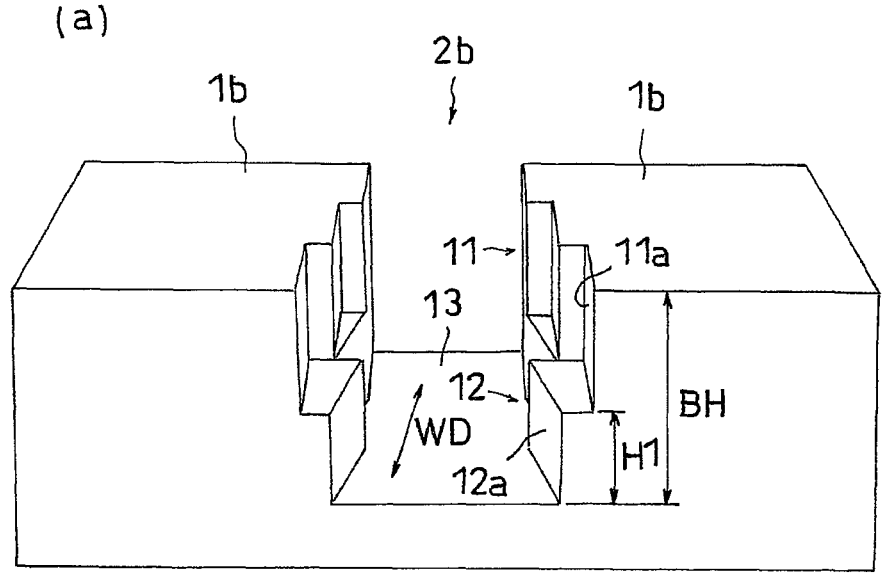
Figure 2:
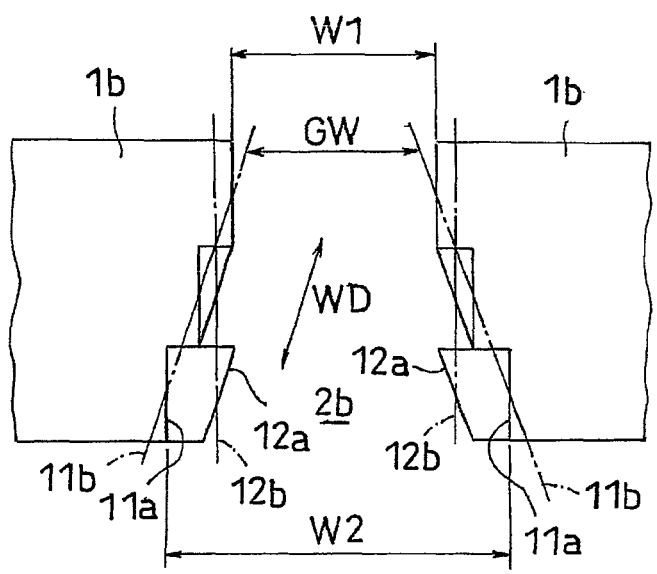

In the tread pattern shown in FIG. 4, the height of the block is fixed to 9 mm, the widths of the transverse groove 2a and 2c are fixed to 7 mm, the width of the top side groove portion 11 of the transverse groove 2b is changed from 6 mm of the minimum to 8 mm of the maximum, as shown in FIGS. 1 and 2, the width of the bottom side groove portion 12 (50% height) of the transverse groove 2b is fixed to 6 mm, the width of the peripheral groove 3a is set to 7 mm, and the width of the peripheral groove 3b is set to 7 mm, whereby a radial tire of size 205/65R15 is manufactured. Table 1 shows the result obtained by executing the respective performance evaluations mentioned above by using the tire.

Example 2

In Example 1, the same structures as Example 1 are employed except that the structure that the top side groove portion 11 and the bottom side groove portion 12 are formed in the same manner as the case of the transverse groove 2 with respect to the transverse groove 2c, whereby the radial tire is manufactured. Table 1 shows the result obtained by executing the respective performance evaluations mentioned above by using the tire.

Comparative Example 2

In Example 1, the same structures as Example 1 are employed except the structure that all the transverse grooves 2b are formed by the top side groove portion 11 without forming the bottom side groove portion 12, whereby the radial tire is manufactured. Table 1 shows the result obtained by executing the respective performance evaluations mentioned above by using the tire.

TABLE 1

|  | Comparative Example 1 | Example 1 | Example 2 | Comparative Example 2 |
|---|---|---|---|---|
| Sherbet road surface driving performance | 100 | 103 | 105 | 105 |
| Wear proof performance | 100 | 105 | 105 | 93 |

As shown by the result in Table 1, both of Examples are excellent in comparison with the conventional product in both of the driving performance on the road surface in the sherbet state, and the wear proof performance. On the contrary, in Comparative Example 2 in which the width of the transverse groove is widened in the tread end side without forming the bottom side groove portion, the rigidity of the block is partly lowered, and the toe-and-heel wear is generated.

What is claimed is:

1. A pneumatic tire provided with a tread pattern having a transverse groove formed between a plurality of blocks, wherein said transverse groove comprises:
    a top side groove portion provided with stepped walls extending, while a groove width of the top side groove portion is defined by an interval between imaginary straight lines running through centers of the respective stepped walls, and expands for the entire length of said top side groove portion, to a tread end side; and
    a bottom side groove portion provided with zigzag wall surfaces extending to a tread end side, while a groove width of the bottom side groove portion is defined by the interval between the imaginary straight lines running through the centers of the respective zigzag wall surfaces and is substantially constant,
    wherein said transverse groove further comprises a first location at which a groove width of the bottom side groove portion is smaller than the groove width of the top side groove portion and a second location at which the groove width of the top side groove portion is greater than the groove width of the bottom side groove portion,
    wherein the bottom side groove portion of said transverse groove is provided a bottom surface of the transverse groove to at a height of 15 to 50% of the block height, and the top side groove portion is provided thereafter.

2. The pneumatic tire as claimed in claim 1, wherein said transverse groove is provided within a region of 0 to 50% of the tread width from the tread ends in both sides.

3. The pneumatic tire as claimed in claim 1, wherein said groove width of the bottom side groove portion at the first location is equal to the groove width at the second location.

4. A pneumatic tire having a tread pattern and tread end sides, wherein the tread pattern comprises a plurality of blocks wherein transverse grooves are formed between the blocks and extend in a transversal direction with respect to a circumferential direction of the tire,
    each of said transverse grooves including a top side groove portion having stepped walls and a bottom side groove portion having zigzag wall surfaces,
    said top side groove portion having a groove width which is defined by an interval between straight lines running through centers of the respective stepped walls and is becoming wider toward the tread end sides for the entire length of said top side groove portion;
    said bottom groove portion having a groove width which is defined by the interval between the imaginary straight lines running through centers of the respective zigzag walls and is substantially constant,
    wherein said transverse grooves further comprise a first location at which a groove width of the bottom side groove portion is smaller than the groove width of the top side groove portion and a second location at which the groove width of the top side groove portion is greater than the groove width of the bottom side groove portion,
    wherein the bottom side groove portion is provided from a bottom surface of the transverse groove to a height of 15% to 50% of the block height, and the top side groove portion is provided thereafter.

5. The pneumatic tire as claimed in claim 4, wherein a ratio of the top side groove width of (W2) at the tread end sides of the blocks to the top side groove width (W1) at sides opposite to the tread end sides of the blocks is 1.05 to 2.

6. The pneumatic tire as claimed in claim 5, wherein the top side groove width (W1) at sides opposite to the tread end sides of the blocks is 3 mm to 7 mm.

7. The pneumatic tire as claimed in claim 4, wherein the substantially constant groove width is 3 mm to 10 mm.

8. The pneumatic tire as claimed in claim 4, wherein the substantially constant groove width is greater than the top side groove width (W1) at sides opposite to the tread end sides of the blocks but smaller than the top side groove width (W2) at the tread end sides of the blocks.

9. The pneumatic tire as claimed in claim 4, wherein the block height is 7 mm to 11 mm.

10. The pneumatic tire as claimed in claim 4, wherein the transverse grooves are provided within a region of 50% or less of the tread width from the tread ends in both sides.

11. The pneumatic tire as claimed in claim 4, wherein said groove width of the bottom side groove portion at the first location is equal to the groove width at the second location.

* * * * *

UNITED STATES PATENT AND TRADEMARK OFFICE
CERTIFICATE OF CORRECTION

PATENT NO.         : 8,844,594 B2                                    Page 1 of 1
APPLICATION NO.    : 11/557436
DATED              : September 30, 2014
INVENTOR(S)        : Toshiyuki Ohashi It is certified that error appears in the above-identified patent and that said Letters Patent is hereby corrected as shown below:

In the Claims

In column 7 at line 40 (approx.), In Claim 1, change "provided" to --provided from--.

In column 8 at line 8 (approx.), In Claim 4, change "between" to --between imaginary--.

Signed and Sealed this
Twenty-first Day of July, 2015

Michelle K. Lee
*Director of the United States Patent and Trademark Office*